United States Patent
Bissontz

(10) Patent No.: US 8,972,084 B2
(45) Date of Patent: *Mar. 3, 2015

(54) CONTROL SYSTEM FOR EQUIPMENT ON A VEHICLE WITH A HYBRID-ELECTRIC POWERTRAIN

(75) Inventor: Jay E Bissontz, Fort Wayne, IN (US)

(73) Assignee: International Truck Intellectual Property Company, LLC, Lisle, IL (US)

(*) Notice: Subject to any disclaimer, the term of this patent is extended or adjusted under 35 U.S.C. 154(b) by 751 days.

This patent is subject to a terminal disclaimer.

(21) Appl. No.: 13/128,827

(22) PCT Filed: Nov. 6, 2009

(86) PCT No.: PCT/US2009/063470
§ 371 (c)(1),
(2), (4) Date: May 11, 2011

(87) PCT Pub. No.: WO2010/056594
PCT Pub. Date: May 20, 2010

(65) Prior Publication Data
US 2011/0224858 A1    Sep. 15, 2011

Related U.S. Application Data

(60) Provisional application No. 61/113,702, filed on Nov. 12, 2008.

(51) Int. Cl.
*G06F 19/00* (2011.01)

(52) U.S. Cl.
USPC ........... 701/22; 180/165; 180/65.22; 180/302

(58) Field of Classification Search
CPC ..... B60W 20/00; B60W 10/08; B60W 10/06; Y02T 10/6286; B60K 6/445
USPC ........... 701/22, 36, 99, 54; 180/65.27, 65.31, 180/52.4, 53.5, 53.8, 65.265, 65.8, 65.625, 180/65.22, 165, 302; 60/413, 325, 494, 60/430; 70/22; 903/902
See application file for complete search history.

(56) References Cited

U.S. PATENT DOCUMENTS

| 6,928,358 B2 | 8/2005 | Brooks et al. |
| 6,963,796 B2 | 11/2005 | Larson et al. |

(Continued)

FOREIGN PATENT DOCUMENTS

| CN | 200942721 Y | * | 9/2007 |
| FR | 2013FR-1350949 | * | 2/2013 |

OTHER PUBLICATIONS

Modeling and control of a novel hydraulic system with energy regeneration; Tao Wang ; Qingfeng Wang; Advanced Intelligent Mechatronics (AIM), 2012 IEEE/ASME International Conference on; DOI: 10.1109/AIM.2012.6265885; Publication Year: 2012 , pp. 922-927.*

(Continued)

*Primary Examiner* — Cuong H Nguyen
(74) *Attorney, Agent, or Firm* — Jeffrey P. Calfa; Mark C. Bach

(57) ABSTRACT

A vehicle having a hydraulic hybrid powertrain comprises a power take off unit, a hydraulic pump, a hydraulic accumulator, an accumulator isolation valve, an accumulator solenoid, and a vehicle hydraulic component. The hydraulic pump mechanically connects to the power take off unit and is driven by the power take off unit. The hydraulic accumulator is disposed in fluid communication with the hydraulic pump and receives and stores pressurized hydraulic fluid from the hydraulic pump. The accumulator isolation valve has a first position and second position. The accumulator isolation valve is disposed in fluid communication with the hydraulic accumulator. The accumulator solenoid connects to the accumulator isolation valve and positions the accumulator isolation valve to the first position and the second position. The vehicle hydraulic component is disposed in fluid communication with the accumulator isolation valve and the hydraulic accumulator.

9 Claims, 17 Drawing Sheets

(56) References Cited

U.S. PATENT DOCUMENTS

| | | | |
|---|---|---|---|
| 7,107,767 B2* | 9/2006 | Frazer et al. | 60/414 |
| 7,165,639 B2 | 1/2007 | Delaney et al. | |
| 7,281,595 B2* | 10/2007 | Bissontz | 180/65.28 |
| 7,455,138 B2 | 11/2008 | Delaney et al. | |
| 8,103,395 B2* | 1/2012 | Bissontz | 701/22 |
| 8,489,254 B2* | 7/2013 | Bissontz | 701/2 |
| 2004/0103656 A1* | 6/2004 | Frazer et al. | 60/414 |
| 2006/0197375 A1* | 9/2006 | Delaney | 303/20 |
| 2007/0135257 A1* | 6/2007 | Bissontz | 477/5 |
| 2009/0044993 A1 | 2/2009 | Bissontz | |
| 2009/0076690 A1* | 3/2009 | Guo et al. | 701/51 |
| 2010/0078234 A1* | 4/2010 | Bissontz | 180/65.24 |
| 2011/0231046 A1* | 9/2011 | Bissontz | 701/22 |
| 2014/0165963 A1* | 6/2014 | Langham | 123/350 |
| 2014/0216023 A1* | 8/2014 | Rabhi | 60/413 |
| 2014/0219600 A1* | 8/2014 | Rabhi | 384/550 |
| 2014/0219848 A1* | 8/2014 | Rabhi | 418/24 |

OTHER PUBLICATIONS

Study of starting and accelerating control strategy for hydraulic hybrid vehicle; Zhang Yin-cai ; Zhi Xiao-hui; Electric Information and Control Engineering (ICEICE), 2011 International Conference on; DOI: 10.1109/ICEICE.2011.5777170; Publication Year: 2011 , pp. 5351-5355.*

Hydraulic system design for full hybrid transmission; Han Bing ; Cai Yixi ; Zhang Tong; Electric Information and Control Engineering (ICEICE), 2011 International Conference on; DOI: 10.1109/ICEICE.2011.5777088; Publication Year: 2011 , pp. 2256-2259.*

An energy management strategy for a hydraulic hybrid vehicle; Deppen, T.O. ; Alleyne, A.G. ; Stelson, K. ; Meyer, J.; American Control Conference (ACC), 2012; DOI: 10.1109/ACC.2012.6315396; Publication Year: 2012 , pp. 1335-1341.*

* cited by examiner

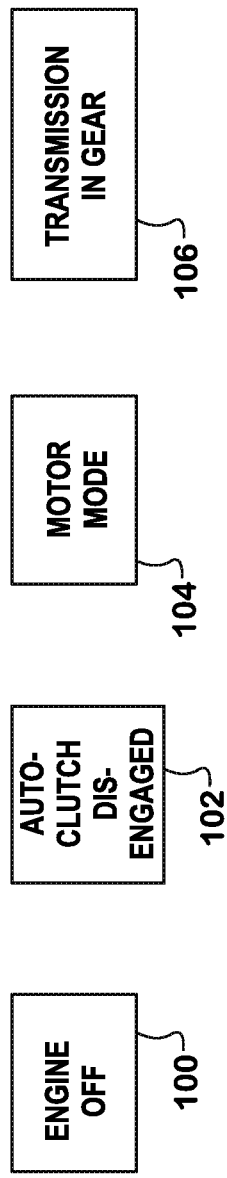

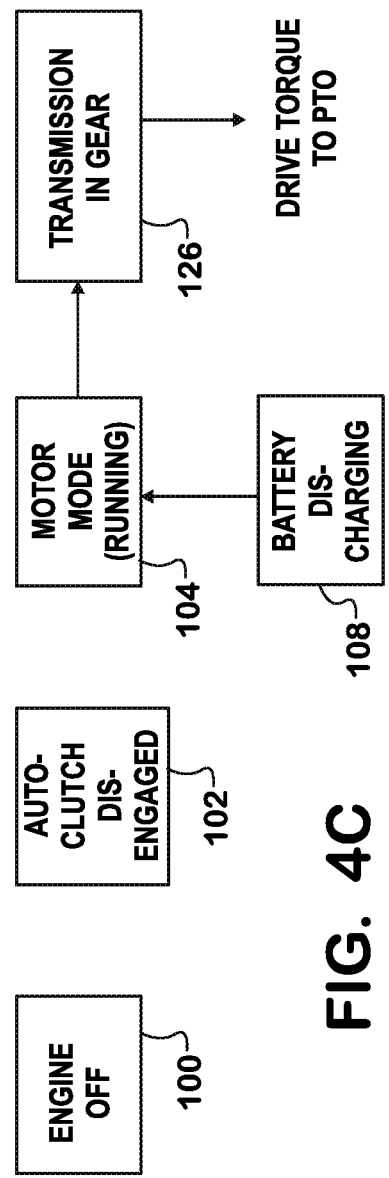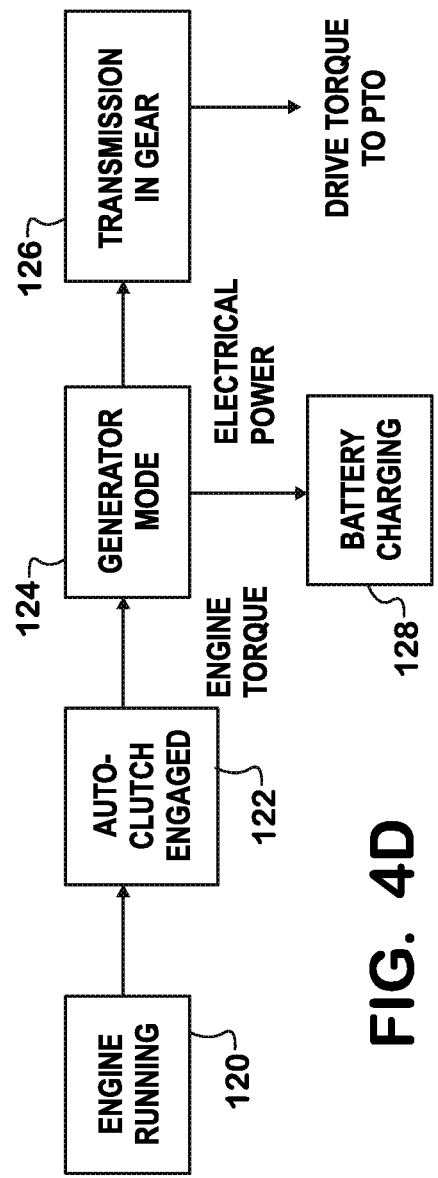
FIG. 4C
FIG. 4D

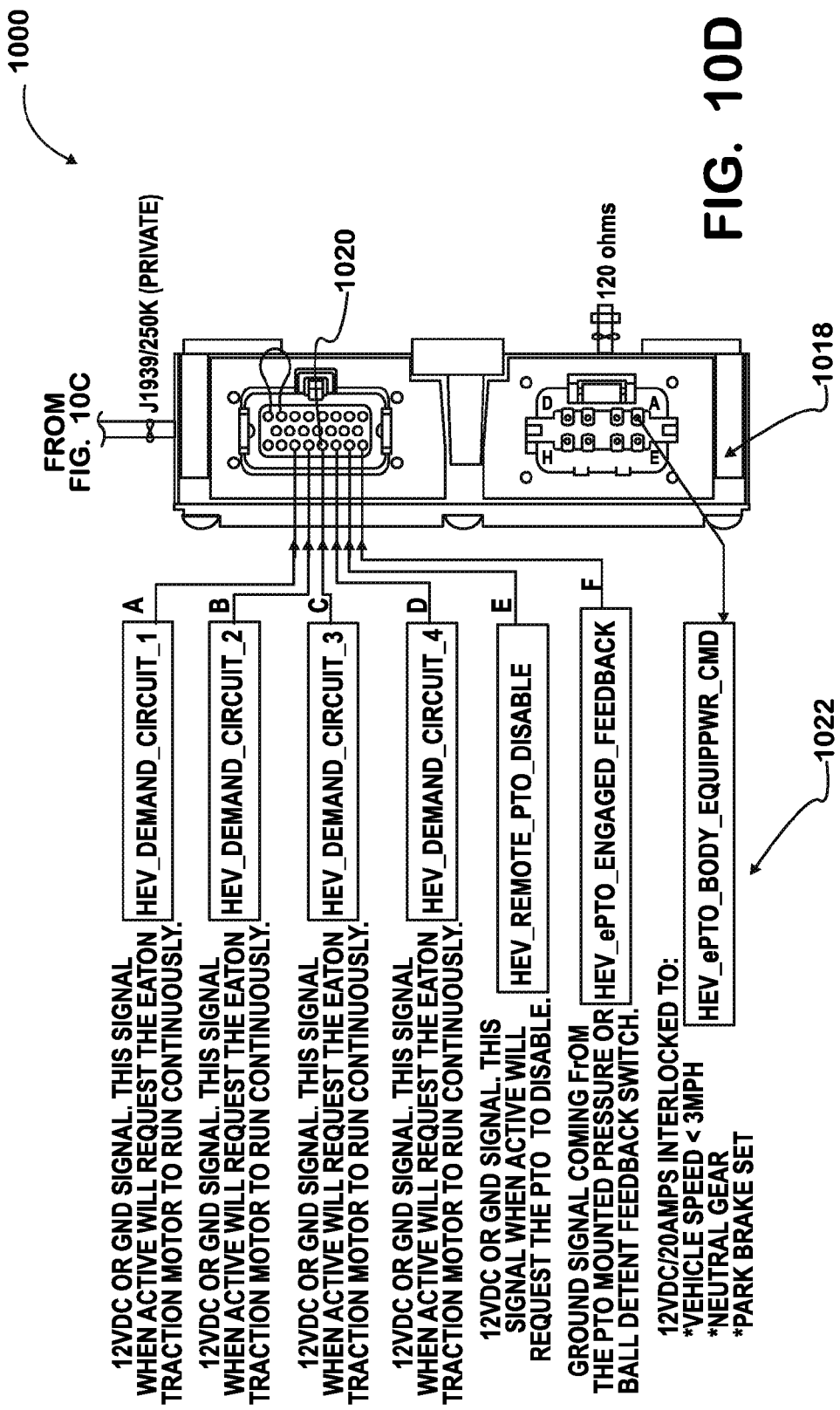

CONTROL SYSTEM FOR EQUIPMENT ON A VEHICLE WITH A HYBRID-ELECTRIC POWERTRAIN

RELATED APPLICATIONS

The present application claims priority to U.S. Provisional Patent Application No. 61/113,702 filed on Nov. 12, 2008, which is herein incorporated by reference in its entirety.

TECHNICAL FIELD

The present disclosure relates to a hydraulic load control system for power take off ("PTO") equipment on a vehicle with a hybrid-electric powertrain, and more particularly to a system and method for transitioning between internal combustion engine powered operation of the PTO and hybrid-electric powertrain powered operation of the PTO that supplies power for the hydraulic load.

BACKGROUND

Many vehicles now utilize hybrid-electric powertrains in order to increase the efficiency of the vehicle. A hybrid-electric powertrain typically involves an internal combustion engine that operates a generator that produces electrical power that may be used to drive electric motors used to move the vehicle. The electric motors may be used to provide power to wheels of the vehicle to move the vehicle, or the electric motors may be used to supplement power provided to the wheels by the internal combustion engine and a transmission. In certain operational situations, the electric motors may supply all of the power to the wheels, such as under low speed operations. In addition to providing power to move the vehicle, the hybrid-electric powertrain may be used to power a PTO of the vehicle, sometimes also referred to as an electric PTO or EPTO when powered by a hybrid-electric powertrain, that in turn powers PTO driven accessories.

In some vehicles, such as utility trucks, for example, a PTO may be used to drive a hydraulic pump for an on-board vehicle hydraulic system. In some configurations, a PTO driven accessory may be powered while the vehicle is moving. In other configurations, a PTO driven accessory may be powered while the vehicle is stationary and the vehicle is being powered by the internal combustion engine. Still others may be driven while the vehicle is either stationary or traveling. Control arrangements are provided for the operator for any type of PTO configuration.

In some PTO applications the vehicle's particular internal combustion engine may be of a capacity that makes it inefficient as a source of motive power for the PTO application due to the relatively low power demands, or intermittent operation, of the PTO application. Under such circumstances the hybrid-electric powertrain may power the PTO, that is, use of the electric motor and generator instead of the IC engine to support mechanical PTO, may be employed. Where power demands are low, the electric motor and generator will typically exhibit relatively low parasitic losses compared to an internal combustion engine. Where power demand is intermittent, but a quick response is provided, the electric motor and generator provides such availability without incurring the idling losses of an internal combustion engine.

Conventionally, once a hybrid electric vehicle equipped for EPTO enters the EPTO operational mode, the electric motor and generator remains unpowered until an active input or power demand signal is provided. Typically, the power demand signal results from an operator input received through a body mounted switch which is part of data link module. Such a module could be the remote power module described in U.S. Pat. No. 6,272,402 to Kelwaski, the entire disclosure of which is incorporated herein by this reference. The switch passes the power demand signal over a data bus such as a Controller Area Network (CAN) now commonly used to integrate vehicle control functions.

A power demand signal for operation of the traction motor is only one of the possible inputs that could occur and which could be received by a traction motor controller connected to the controller area network of the vehicle. Due to the type, number and complexities of the possible inputs that can be supplied from a data link module added by a truck equipment manufacturer (TEM), as well as from other sources, issues may arise regarding adequate control of the electric motor and generator, particularly during the initial phases of a product's introduction, or during field maintenance, especially if the vehicle has been subject to operator modification or has been damaged. As a result the traction motor may not operate as expected. In introducing a product, a TEM can find itself in a situation where the data link module cannot provide accurate power demand requests for electric motor and generator operation for EPTO operation due to programming problems, interaction with other vehicle programming, or other architectural problems.

A hybrid-electric powertrain may solely power the PTO of the vehicle when the PTO is operating a PTO driven accessory adapted to only be utilized by a stopped vehicle, such as lift attachment, or a digging attachment. In some situations, the hybrid-electric powertrain is not capable of providing sufficient power to the PTO, and thus, the PTO needs to be powered by the internal combustion engine. In other situations, batteries of the hybrid-electric powertrain may need to be recharged. In both of these situations, if the PTO is being powered by the hybrid-electric powertrain, the PTO must be stopped, such that the internal combustion engine may be started to deliver power to the PTO, or to recharge batteries of the hybrid-electric powertrain. Therefore, a need exists for a system and method that is capable of shutting down a PTO that is being driven by a hybrid-electric powertrain, such that an internal combustion engine may be started to power the PTO, or to recharge batteries of the hybrid-electric powertrain.

SUMMARY

According to one embodiment, a vehicle having a hydraulic hybrid powertrain comprises a power take off unit, a hydraulic pump, a hydraulic accumulator, an accumulator isolation valve, an accumulator solenoid, and a vehicle hydraulic component. The hydraulic pump mechanically connects to the power take off unit and is driven by the power take off unit. The hydraulic accumulator is disposed in fluid communication with the hydraulic pump and receives and stores pressurized hydraulic fluid from the hydraulic pump. The accumulator isolation valve has a first position and second position. The accumulator isolation valve is disposed in fluid communication with the hydraulic accumulator. The accumulator solenoid connects to the accumulator isolation valve and positions the accumulator isolation valve to the first position and the second position. The vehicle hydraulic component is disposed in fluid communication with the accumulator isolation valve and the hydraulic accumulator.

According to another embodiment, a control system for a vehicle having a hybrid-electric powertrain comprises an electronic control module, an electronic system controller, a hybrid control module, a remote throttle, and a variable displacement hydraulic pump. The electronic system controller is disposed in electrical communication with the electronic control module. The hybrid control module is disposed in electrical communication with the electronic control module and the electronic system controller. The remote throttle is disposed in electrical communication with the electronic control module. The variable displacement hydraulic pump has a displacement adjustment portion disposed in electrical communication with the electronic system controller. The variable displacement portion has at least a first position and a second position. Wherein the variable displacement portion is moved from the first position to the second position in response to an output signal from the electronic system controller.

According to another embodiment, a control system for a vehicle having a hydraulic hybrid powertrain comprises a vehicle hydraulic component signal generation device, a datalink module, an electronic system controller, and an electronic control module. The datalink module is disposed in electrical communication with the vehicle hydraulic component signal generation device. The electronic system controller is disposed in electrical communication with the datalink module. The electronic control module is disposed in electrical communication with the electronic system.

According to one process, a method of operating a vehicle having a hydraulic hybrid powertrain is provided. An output signal is generated from a vehicle hydraulic component transducer. The output signal from the vehicle hydraulic component transducer transmits to an electronic system controller. A remote power module energizes in response to the output signal from the vehicle hydraulic component transducer user input switch. An accumulator isolation valve opens in response to energizing the remote power module. Hydraulic fluid is provided from a hydraulic accumulator to a vehicle hydraulic component in response to opening the accumulator isolation valve.

BRIEF DESCRIPTION OF THE DRAWINGS

FIGS. 4A-D are schematic illustrations of a hybrid powertrain applied to support a power take-off operation.

DETAILED DESCRIPTION

Figure 1:
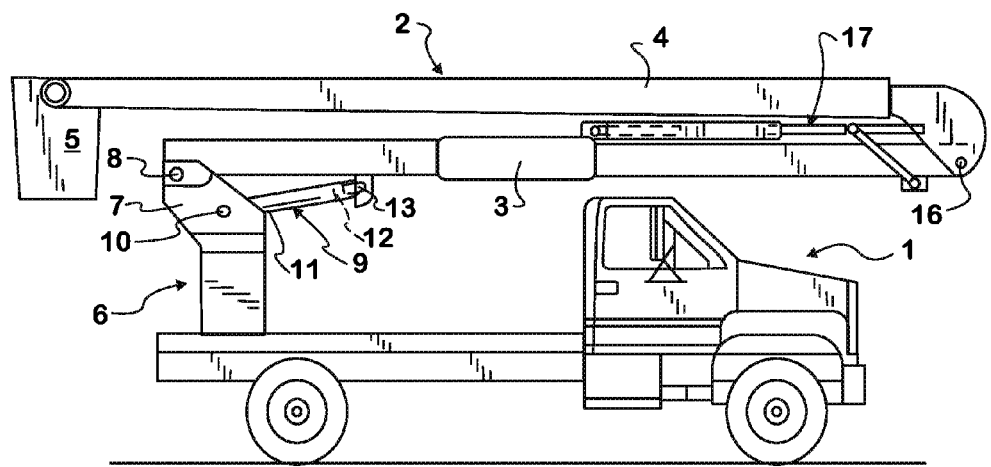
FIG. 1 is a side elevation of a vehicle equipped for a power take-off operation.

Referring now to the figures and in particular to FIG. 1, a hybrid mobile aerial lift truck 1 is illustrated. Hybrid mobile aerial lift truck 1 serves as an example of a medium duty vehicle which supports a PTO vocation, or an EPTO vocation. It is to be noted that embodiments described herein, possibly with appropriate modifications, may be used with any suitable vehicle. Additional information regarding hybrid powertrains may be found in U.S. Pat. No. 7,281,595 entitled "System For Integrating Body Equipment With a Vehicle Hybrid Powertrain," which is assigned to the assignee of the present application and which is fully incorporated herein by reference.

The mobile aerial lift truck 1 includes a PTO load, here an aerial lift unit 2 mounted to a bed on a back portion of the truck 1. During configuration for EPTO operation, the transmission for mobile aerial lift truck 1 may be placed in park, the park brake may be set, outriggers may be deployed to stabilize the vehicle, and indication from an onboard network that vehicle speed is less than 5 kph may be received before the vehicle enters PTO mode. For other types of vehicles different indications may indicate readiness for PTO operation, which may or may not involve stopping the vehicle.

The aerial lift unit 2 includes a lower boom 3 and an upper boom 4 pivotally connected to each other. The lower boom 3 is in turn mounted to rotate on the truck bed on a support 6 and rotatable support bracket 7. The rotatable support bracket 7 includes a pivoting mount 8 for one end of lower boom 3. A bucket 5 is secured to the free end of upper boom 4 and supports personnel during lifting of the bucket to and support of the bucket within a work area. Bucket 5 is pivotally attached to the free end of boom 4 to maintain a horizontal orientation. A lifting unit 9 is connected between bracket 7 and the lower boom 3. A pivot connection 10 connects the lower boom cylinder 11 of unit 9 to the bracket 7. A cylinder rod 12 extends from the cylinder 11 and is pivotally connected to the boom 3 through a pivot 13. Lower boom cylinder unit 9 is connected to a pressurized supply of a suitable hydraulic fluid, which allows the assembly to be lifted and lowered. A source of pressurized hydraulic fluid may be an automatic transmission or a separate pump. The outer end of the lower boom 3 is connected to the lower and pivot end of the upper boom 4. A pivot 16 interconnects the outer end of the lower boom 3 to the pivot end of the upper boom 4. An upper boom compensating cylinder unit or assembly 17 is connected between the lower boom 3 and the upper boom 4 for moving the upper boom about pivot 16 to position the upper boom relative to the lower boom 3. The upper-boom, compensating cylinder unit 17 allows independent movement of the upper boom 4 relative to lower boom 3 and provides compensating motion between the booms to raise the upper boom with the lower boom. Unit 17 is supplied with pressurized hydraulic fluid from the same source as unit 9.

Figure 2:
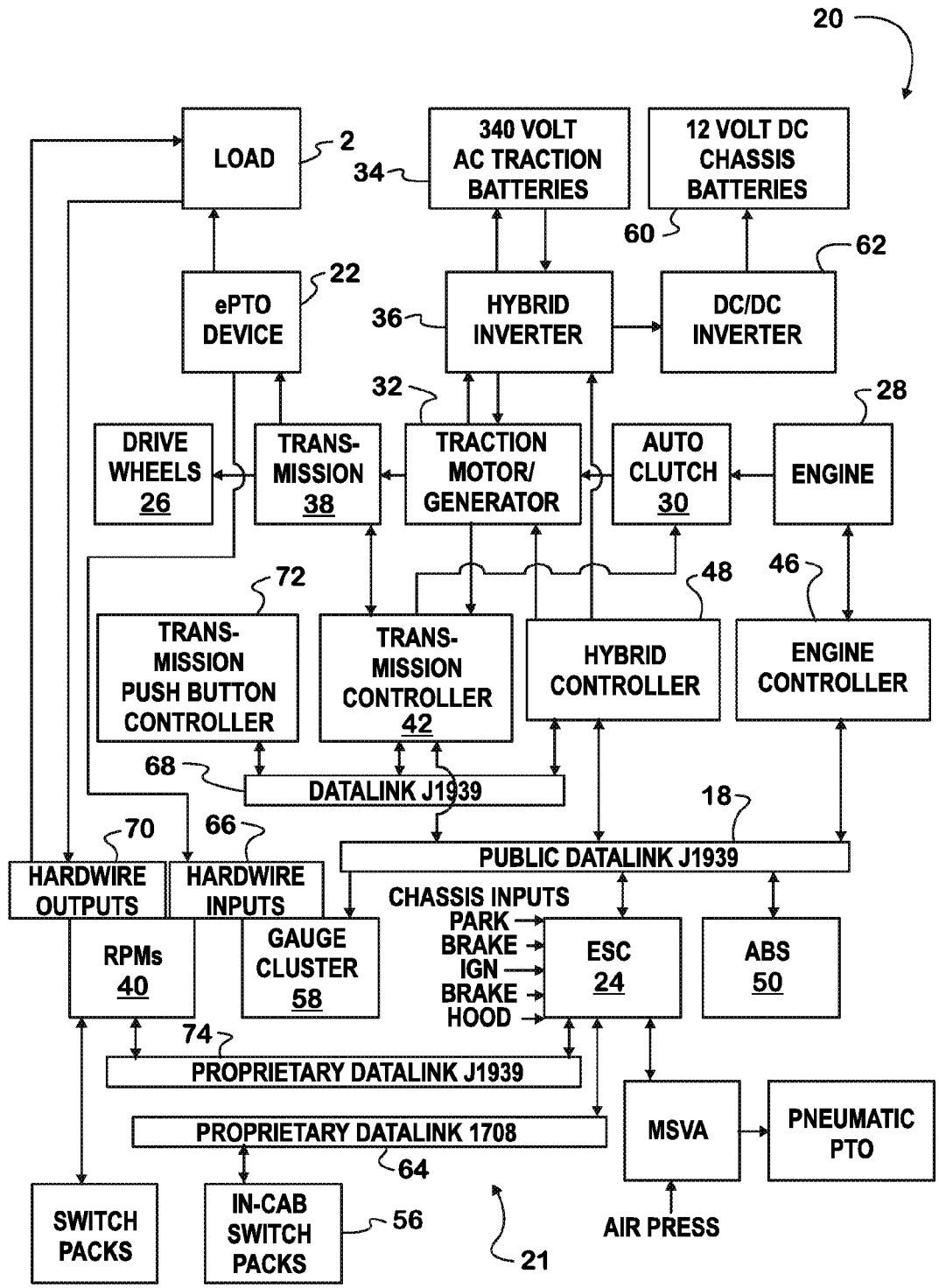
FIG. 2 is a high level block diagram of a control system for the vehicle of FIG. 1.

Referring to FIG. 2, a high level schematic of a control system 21 representative of a system usable with vehicle 1 control is illustrated. An electrical system controller 24, a type of a body computer, is linked by a public datalink 18 (here illustrated as a SAE compliant J1939 CAN bus) to a variety of local controllers which in turn implement direct control over most vehicle 1 functions. Electrical system controller ("ESC") 24 may also be directly connected to selected inputs and outputs and other busses. Direct "chassis inputs" include, an ignition switch input, a brake pedal position input, a hood position input and a park brake position sensor, which are connected to supply signals to the ESC 24. Other inputs to ESC 24 may exist. Signals for PTO operational control from within a cab may be implemented using an in-cab switch pack(s) 56. In-cab switch pack 56 is connected to ESC 24 over a proprietary data link 64 conforming to the SAE J1708 standard. Data link 64 is a low baud rate data connection, typically on the order of 9.7 Kbaud. Five controllers in addition to the ESC 24 are illustrated connected to the public datalink 18. These controllers are the engine controller ("ECM") 46, the transmission controller 42, a gauge cluster controller 58, a hybrid controller 48 and an antilock brake system controller ("ABS") 50. Other controllers may exist on a given vehicle. Datalink 18 is the bus for a public controller area network ("CAN") conforming to the SAE J1939 standard and under current practice supports data transmission at up to 250 Kbaud. It will be understood that other controllers may be installed on the vehicle 1 in communication with datalink 18. ABS controller 50, as is conventional, controls application of brakes 52 and receives wheel speed sensor signals from sensors 54. Wheel speed is reported over datalink 18 and is monitored by transmission controller 42.

Vehicle 1 is illustrated as a parallel hybrid electric vehicle which utilizes a powertrain 20 in which the output of either an internal combustion engine 28, an electric motor and generator 32, or both, may be coupled to the drive wheels 26. Internal combustion engine 28 may be a diesel engine. As with other full hybrid systems, the system is intended to recapture the vehicle's inertial momentum during braking or slowing. The electric motor and generator 32 is run as a generator from the wheels, and the generated electricity is stored in batteries during braking or slowing. Later the stored electrical power can be used to run the electric motor and generator 32 instead of or to supplement the internal combustion engine 28 to extend the range of the vehicle's conventional fuel supply. Powertrain 20 is a particular variation of hybrid design which provides support for PTO either from internal combustion engine 28 or from the electric motor and generator 32. When the internal combustion engine 28 is used for PTO it can be run at an efficient power output level and used to concurrently support of PTO operation and to run the electric motor and generator 32 in its generator mode to recharge the traction batteries 34. Usually a PTO application consumes less power than power output at a thermally efficient internal combustion engine 28 throttle setting.

The electric motor and generator 32 is used to recapture the vehicle's kinetic energy during deceleration by using the drive wheels 26 to drive the electric motor and generator 32. At such times auto-clutch 30 disconnects the engine 28 from the electric motor and generator 32. Engine 28 may be utilized to supply power to both generate electricity and operate PTO system 22, to provide motive power to drive wheels 26, or to provide motive power and to run a generator to generate electricity. Where the PTO system 22 is an aerial lift unit 2 it is unlikely that it would be operated when the vehicle was in motion, and the description here assumes that in fact that the vehicle will be stopped for EPTO, but other PTO applications may exist where this is not done.

Powertrain 20 provides for the recapture of kinetic energy in response to the electric motor and generator 32 being back driven by the vehicle's kinetic force. The transitions between positive and negative traction motor contribution are detected and managed by a hybrid controller 48. Electric motor and generator 32, during braking, generates electricity which is applied to traction batteries 34 through inverter 36. Hybrid controller 48 looks at the ABS controller 50 datalink traffic to determine if regenerative kinetic braking would increase or enhance a wheel slippage condition if regenerative braking were initiated. Transmission controller 42 detects related data traffic on datalink 18 and translates these data as control signals for application to hybrid controller 48 over datalink 68. Electric motor and generator 32, during braking, generates electricity which is applied to the traction batteries 34 through hybrid inverter 36. Some electrical power may be diverted from hybrid inverter to maintain the charge of a conventional 12-volt DC Chassis battery 60 through a voltage step down DC/DC inverter 62.

Traction batteries may be the only electrical power storage system for vehicle 1. In vehicles contemporary to the writing of this application numerous 12 volt applications remain in common use and vehicle 1 may be equipped with a parallel 12 volt system to support the vehicle. This possible parallel system is not shown for the sake of simplicity of illustration. Inclusion of such a parallel system would allow the use of readily available and inexpensive components designed for motor vehicle use, such as incandescent bulbs for illumination. However, using 12 volt components may incur a vehicle weight penalty and involve extra complexity.

Electric motor and generator 32 may be used to propel vehicle 1 by drawing power from battery 34 through inverter 36, which supplies 3 phase 340 volt rms power. Battery 34 is sometimes referred to as the traction battery to distinguish it from a secondary 12 volt lead acid battery 60 used to supply power to various vehicle systems. However, high mass utility vehicles tend to exhibit far poorer gains from hybrid locomotion than do automobiles. Thus stored electrical power is also used to power the EPTO system 22. In addition, electric motor and generator 32 is used for starting engine 28 when the ignition is in the start position. Under some circumstances engine 28 is used to drive the electric motor and generator 32 with the transmission 38 in a neutral state to generate electricity for recharging battery 34 and/or engaged to the PTO system 22 to generate electricity for recharging the battery 34 and operate the PTO system 22. This would occur in response to heavy PTO system 22 use which draws down the charge on battery 34. Typically engine 28 has a far greater output capacity than is used for operating PTO system 22. As a result, using it to directly run PTO system 22 full time would be highly inefficient due to parasitic losses incurred in the engine or idling losses which would occur if operation were intermittent. Greater efficiency is obtained by running engine 22 at close to its rated output to recharge battery 34 and provide power to the PTO, and then shutting down the engine and using battery 34 to supply electricity to electric motor and generator 32 to operate PTO system 22.

An aerial lift unit 2 is an example of a system which may be used only sporadically by a worker first to raise and later to reposition its basket 5. Operating the aerial lift unit 2 using the traction motor 32 avoids idling of engine 28. Engine 28 runs periodically at an efficient speed to recharge the battery if battery 34 is in a state of relative discharge. Battery 34 state of charge is determined by the hybrid controller 48, which passes this information to transmission controller 42 over datalink 68. Transmission controller 42 can in turn can request ESC 24 to engage engine 28 by a message to the ESC 24, which in turn sends engine operation requests (i.e. engine start and stop signals) to ECM 46. The availability of engine 28 may depend on certain programmed (or hardwired) interlocks, such as hood position.

Powertrain 20 comprises an engine 28 connected in line with an auto clutch 30 which allows disconnection of the engine 28 from the rest of the powertrain when the engine is not being used for motive power or for recharging battery 34. Auto clutch 30 is directly coupled to the electric motor and generator 32 which in turn is connected to a transmission 38. Transmission 38 is in turn used to apply power from the electric motor and generator 32 to either the PTO system 22 or to drive wheels 26. Transmission 38 is bi-directional and can be used to transmit energy from the drive wheels 26 back to the electric motor and generator 32. Electric motor and generator 32 may be used to provide motive energy (either alone or in cooperation with the engine 28) to transmission 38. When used as a generator the electric motor and generator supplies electricity to inverter 36 which supplies direct current for recharging battery 34.

A control system 21 implements cooperation of the control elements for the operations just described. ESC 24 receives inputs relating to throttle position, brake pedal position, ignition state and PTO inputs from a user and passes these to the transmission controller 42 which in turn passes the signals to the hybrid controller 48. Hybrid controller 48 determines, based on available battery charge state, whether the internal combustion engine 28 or the traction motor 32 satisfies requests for power. Hybrid controller 48 with ESC 24 generates the appropriate signals for application to datalink 18 for instructing the ECM 46 to turn engine 28 on and off and, if on, at what power output to operate the engine. Transmission controller 42 controls engagement of auto clutch 30. Transmission controller 42 further controls the state of transmission 38 in response to transmission push button controller 72, determining the gear the transmission is in or if the transmission is to deliver drive torque to the drive wheels 26 or to a hydraulic pump which is part of PTO system 22 (or simply pressurized hydraulic fluid to PTO system 22 where transmission 38 serves as the hydraulic pump) or if the transmission is to be in neutral. For purposes of illustration only, a vehicle may come equipped with more than one PTO system, and a secondary pneumatic system using a multi-solenoid valve assembly 85 and pneumatic PTO device 87 is shown under the direct control of ESC 24.

PTO 22 control is conventionally implemented through one or more remote power modules (RPMs). Remote power modules are data-linked expansion input/output modules dedicated to the ESC 24, which is programmed to utilize them. Where RPMs 40 function as the PTO controller they can be configured to provide hardwire outputs 70 and hardwire inputs used by the PTO device 22 and to and from the load/aerial lift unit 2. Requests for movement from the aerial lift unit 2 and position reports are applied to the proprietary datalink 74 for transmission to the ESC 24, which translates them into specific requests for the other controllers, e.g. a request for PTO power. ESC 24 is also programmed to control valve states through RPMs 40 in PTO device 22. Remote power modules are more fully described in U.S. Pat. No. 6,272,402, which is assigned to the assignee of the present application and which is fully incorporated herein by reference. At the time the '402 patent was written what are now termed "Remote Power Modules" were called "Remote Interface Modules". It is contemplated that the TEMs who provide the PTO vocation will order or equip a vehicle with RPMs 40 to support the PTO and supply a switch pack 57 for connection to the RPM 40. TEMs are colloquially known as "body builders" and signals from an RPM 40 provided for body builder supplied vehicle vocations are termed "body power demand signals".

Body power demand signals may be subject to corruption, vehicle damage or architectural conflicts over the vehicle controller area network. Accordingly an alternative mechanism is provided to generate power demand signals for the PTO from the vehicle's conventional control network. A way of providing for operator initiation of such a power demand signal without use of RPM 40 is to use the vehicle's conventional controls including controls which give rise to what are termed "chassis inputs". Power demand signals for PTO operation originating from such alternative mechanisms are termed "chassis power demand signals". An example of such could be flashing the headlamps twice while applying the parking brake, or some other easy to remember, but seemingly idiosyncratic control usage, so long as the control choice does not involve the PTO dedicated RPM 40.

Transmission controller and ESC 24 both operate as portals and/or translation devices between the various datalinks. Proprietary datalinks 68 and 74 operate at substantially higher baud rates than does the public datalink 18, and accordingly, buffering is provided for a message passed from one link to another. Additionally, a message may be reformatted, or a message on one link may be changed to another type of message on the second link, e.g. a movement request over datalink 74 may translate to a request for transmission engagement from ESC 24 to transmission controller 42. Datalinks 18, 68 and 74 are all controller area networks and conform to the SAE J1939 protocol. Datalink 64 conforms to the SAE J1708 protocol.

Figure 3:
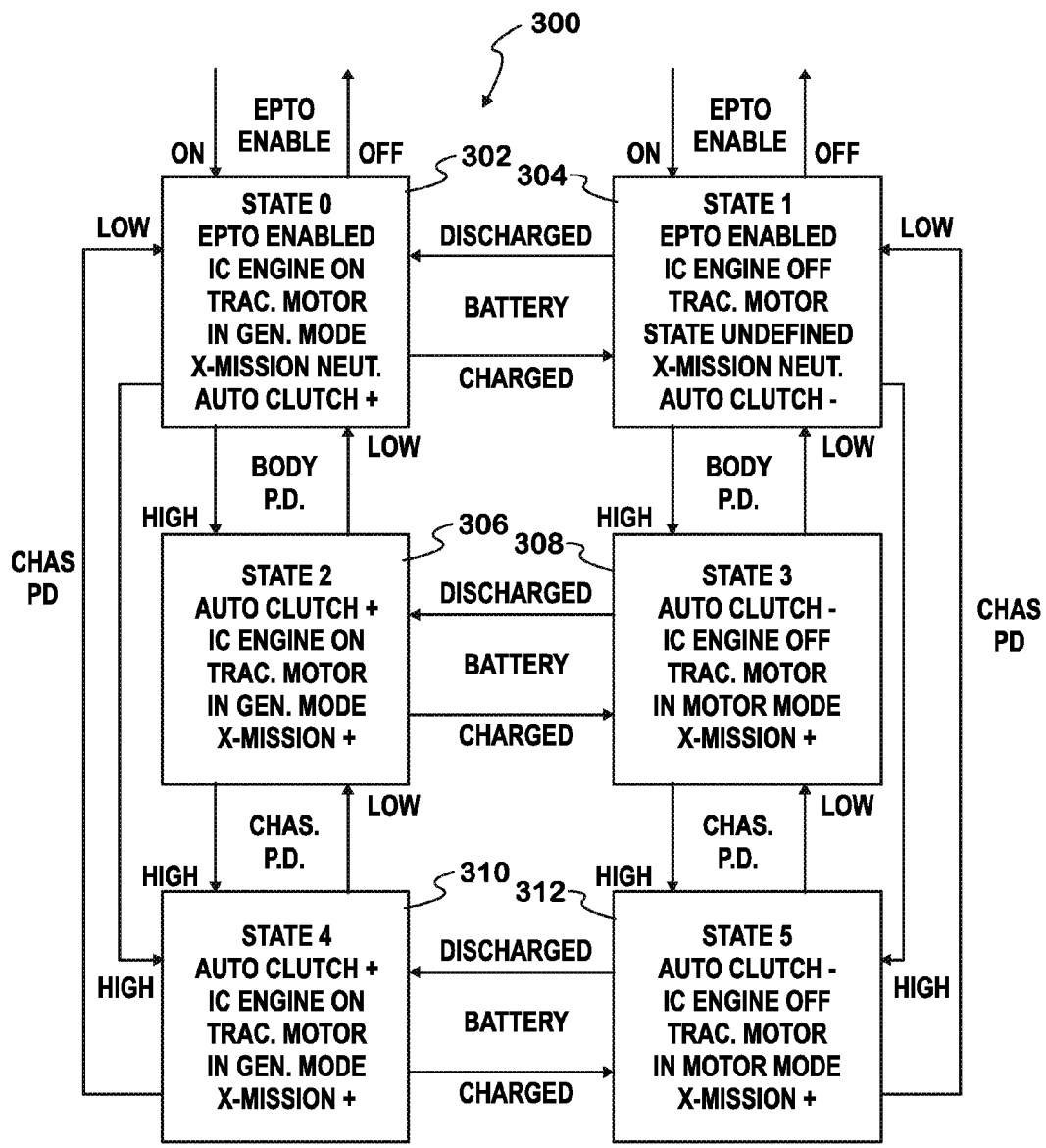
FIG. 3 is a diagram for a state machine relating to a power take-off operation which can be implemented on the control system of FIG. 2.

Referring to FIG. 3 a representative state machine 300 is used to illustrate one possible control regime. State machine 300 is entered through either of two EPTO enabled states 300, 302, depending upon whether engine 28 is operating to recharge the traction batteries 34 or not. In the EPTO enabled state the conditions triggering EPTO operation have been met, but the actual PTO vocation is not powered. Depending upon the state of charge of the traction batteries 34, engine 28 may be operating (state 302) or may not be running (state 304). In any state where the engine 28 is on the auto clutch 30 is engaged (+). The state of charge which initiates battery charging is less than the state of charge at which charging is discontinued to prevent frequent cycling of the engine 28 on and off. The EPTO enabled states (302, 304) provide that the transmission 38 is disengaged. In state 302 where batteries 34 are being charged, the electric motor and generator 32 is in its generator mode. In state 304 where batteries 34 are considered charged, the state of the electric motor and generator 32 need not be defined and may be left in its prior state.

Four EPTO operating states, 306, 308, 310 and 312 are defined. These states occur in response to either a body power demand or chassis power demand. Within PTO vehicle battery charging continues to function. State 306 provides that the engine 28 be on, the auto clutch 30 be engaged, the electric motor and generator 32 be in its generator mode and the transmission be in gear for PTO. In state 308 the engine 28 is off, the auto clutch 30 is disengaged, the traction motor is in its motor mode and running and the transmission 38 be in gear for PTO. States 306 and 308, as a class, are exited upon loss of the body power demand signal (which may occur as a result of cancellation of PTO enable) or upon or occurrence of a chassis power demand signal. Changes in state stemming from the battery state of charge can force changes within the class between states 306 and 308. EPTO operating states 310 and 312 are identical to states 306 and 308, respectively, except that loss of the body power demand signal does not result in one of states 310, 312 being exited. Only loss of the chassis power demand signal results in exit from EPTO operating states 310 or 312, taken as a class, although transitions within the class (i.e. between 310 and 312) can result from the battery state of charge. Upon loss of a chassis power demand signal the exit route from states 310, 312, depends upon whether a body power demand signal is present. If it is the operational state moves from states 310 or 312 to states 306 or 308, respectively. If it is not, then to states 302 or 304. If the body power demand signal was lost due to exit from the EPTO enable conditions than states 302 or 304 are exited along the "OFF" routes. For transitions within a class, particularly from an engine 28 off to an engine 28 on state, an intermediary state may be provided where the auto-clutch 30 is engaged to permit the traction motor to crank the engine.

FIGS. 4A-D illustrate graphically what occurs on the vehicle in the various states of the state machine implemented through appropriate programming of the ESC 24. FIG. 4A corresponds to state 304, one of the EPTO enabled state. FIG. 4B corresponds to state 302, the other EPTO enabled state. FIG. 4C corresponds to states 308 and 312, while FIG. 4D corresponds to states 306 and 310. In FIG. 4A the IC engine 28 is off (state 100), the auto clutch is disengaged (state 102), the electric motor and generator 32 state may be undefined, but is shown as being motor mode (104). With electric motor and generator 32 in the motor mode the battery is shown in a discharge ready state 108. The transmission is shown as in gear (106), though this is elective. In FIG. 4B battery charging 128 is occurring as a result of the IC engine running 120, the auto clutch being engaged 122 with engine torque being applied through the auto clutch to the electric motor and generator 32 operating in its generator mode 124. The transmission is out of gear 126.

FIG. 4C corresponds to state machine 300 states 308 and 312 with the engine 28 being off 100, the auto clutch 30 being disengaged 102. The battery 34 is discharging 108 to operate the traction motor in its running state 104 to apply torque to the transmission 38 which is in gear 126 to apply drive torque to the PTO. FIG. 4D corresponds to state machine 300 states 306 and 310. The IC engine 28 is running 120 to supply power through an engaged 122 auto clutch to operate the electric motor and generator 32 in it generator mode to supply electrical power to a charging (128) battery and to supply torque through the transmission to the PTO application.

Figure 5:
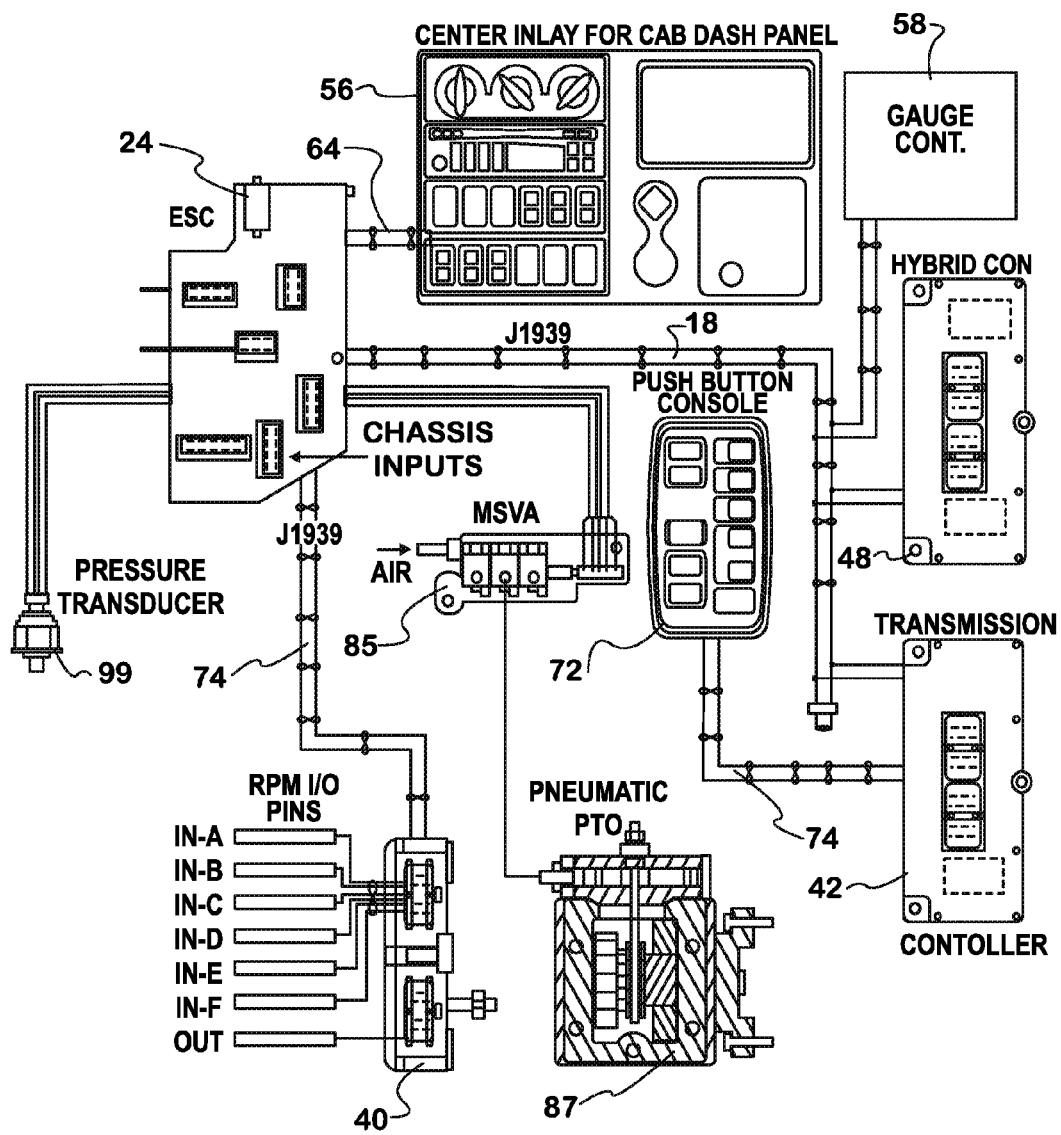
FIG. 5 is a system diagram for chassis and body initiated hybrid electric motor and generator control for power take-off operation.
Figure 6:
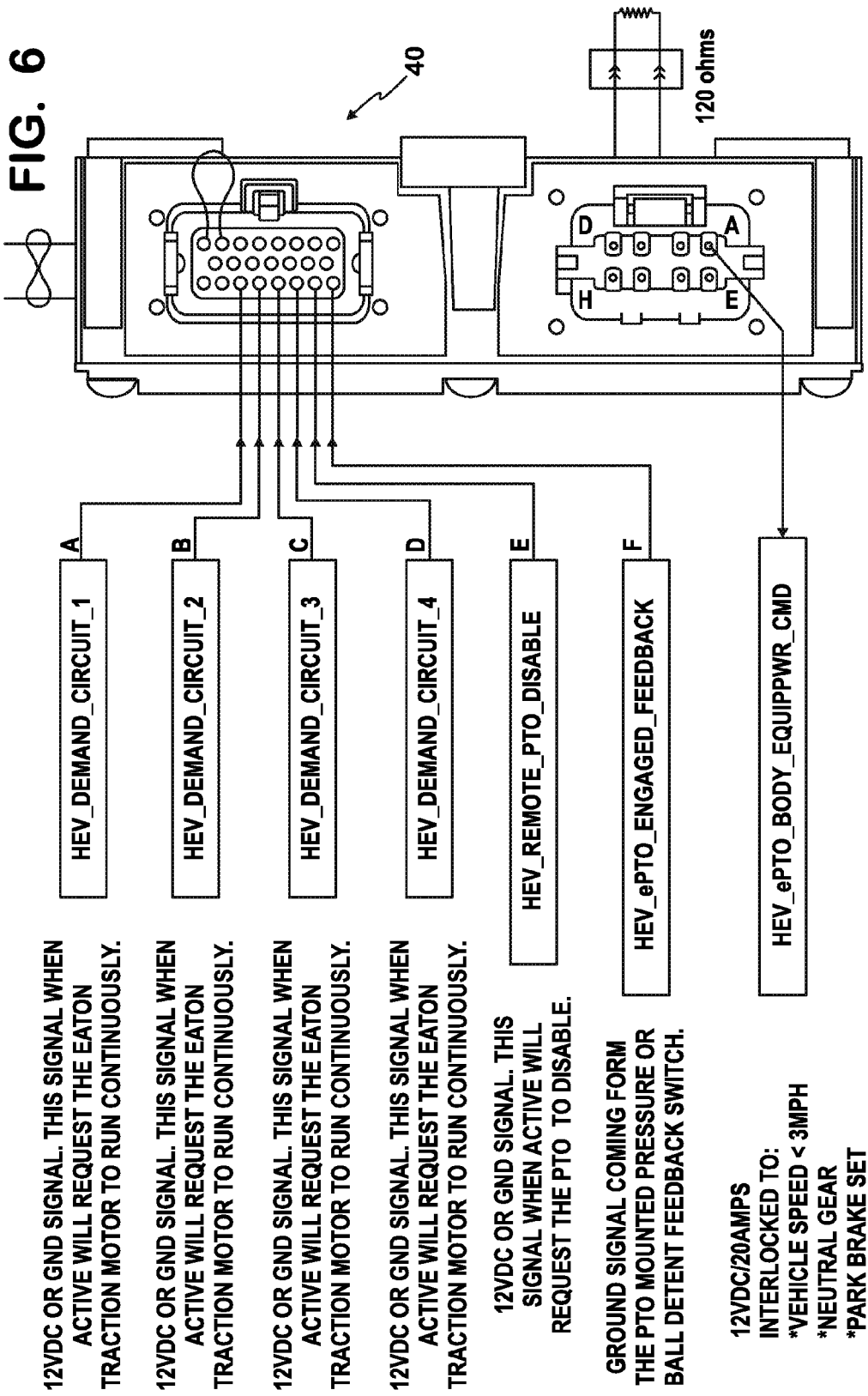
FIG. 6 is a map of input and output pin connections for a remote power module in the system diagram of FIG. 5.
Figure 7:
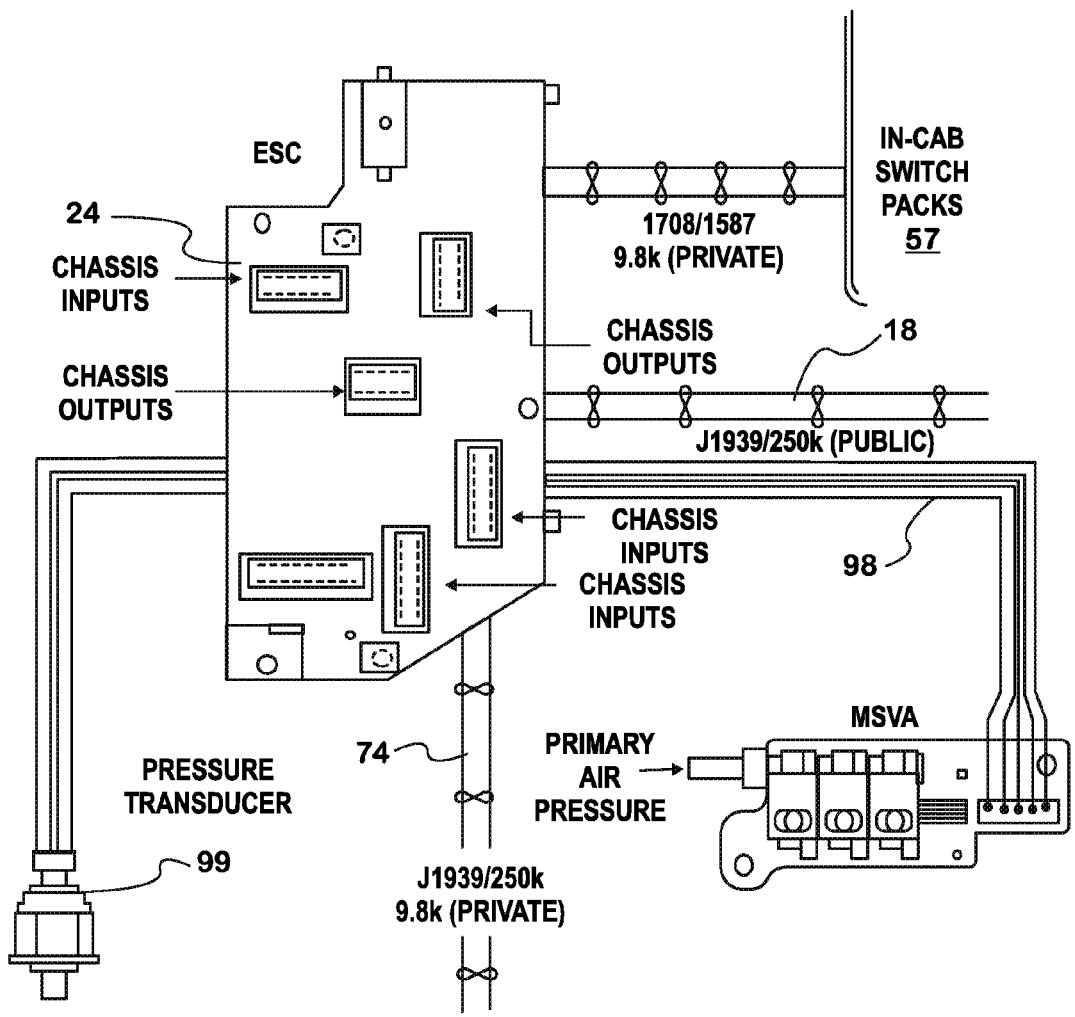
FIG. 7 is a map of input and output locations for the electrical system controller of FIG. 5.
Figure 8A:
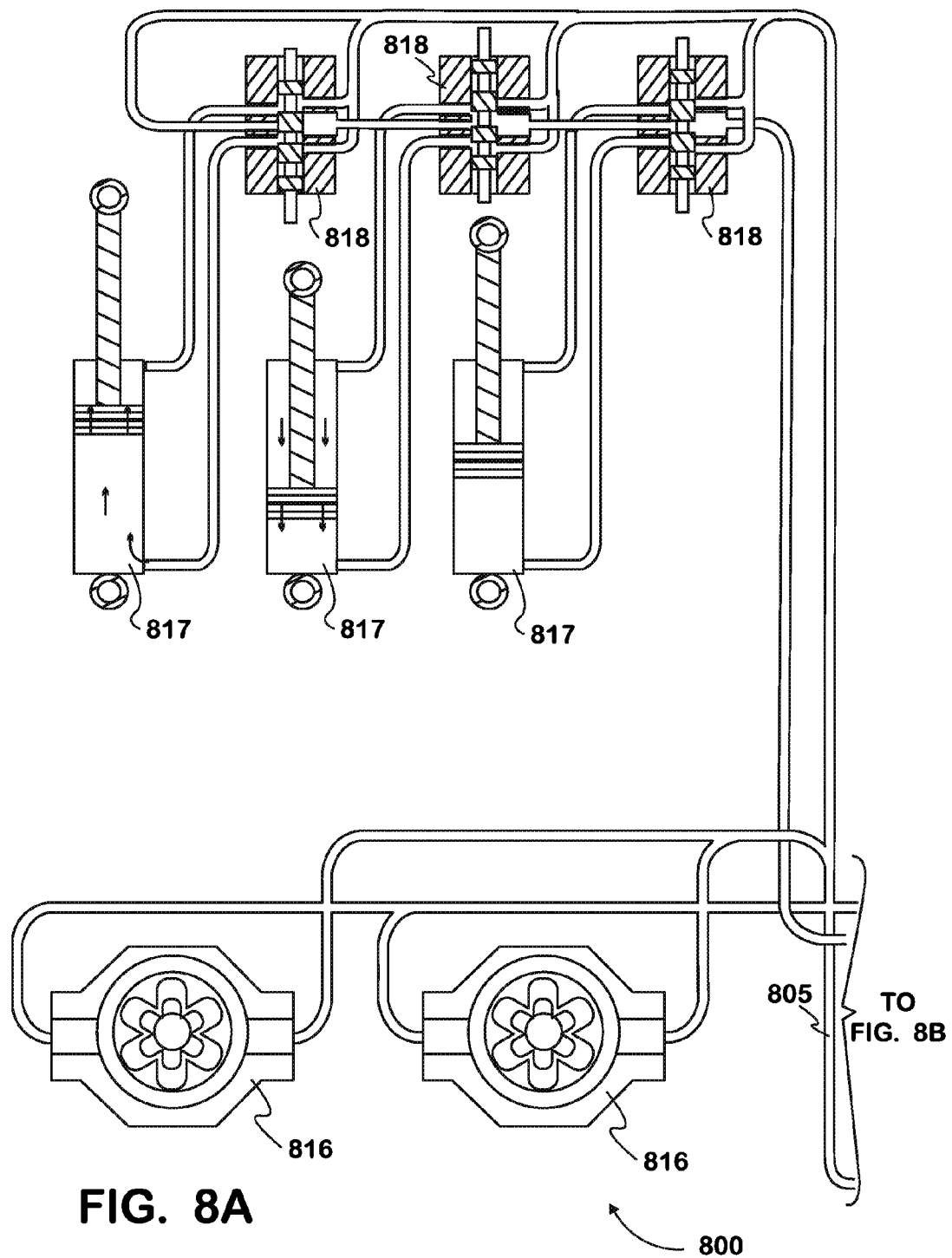
FIG. 8 is a schematic view of a vehicle having a hybrid-electric powertrain with a PTO driven hydraulic system.
Figure 8B:
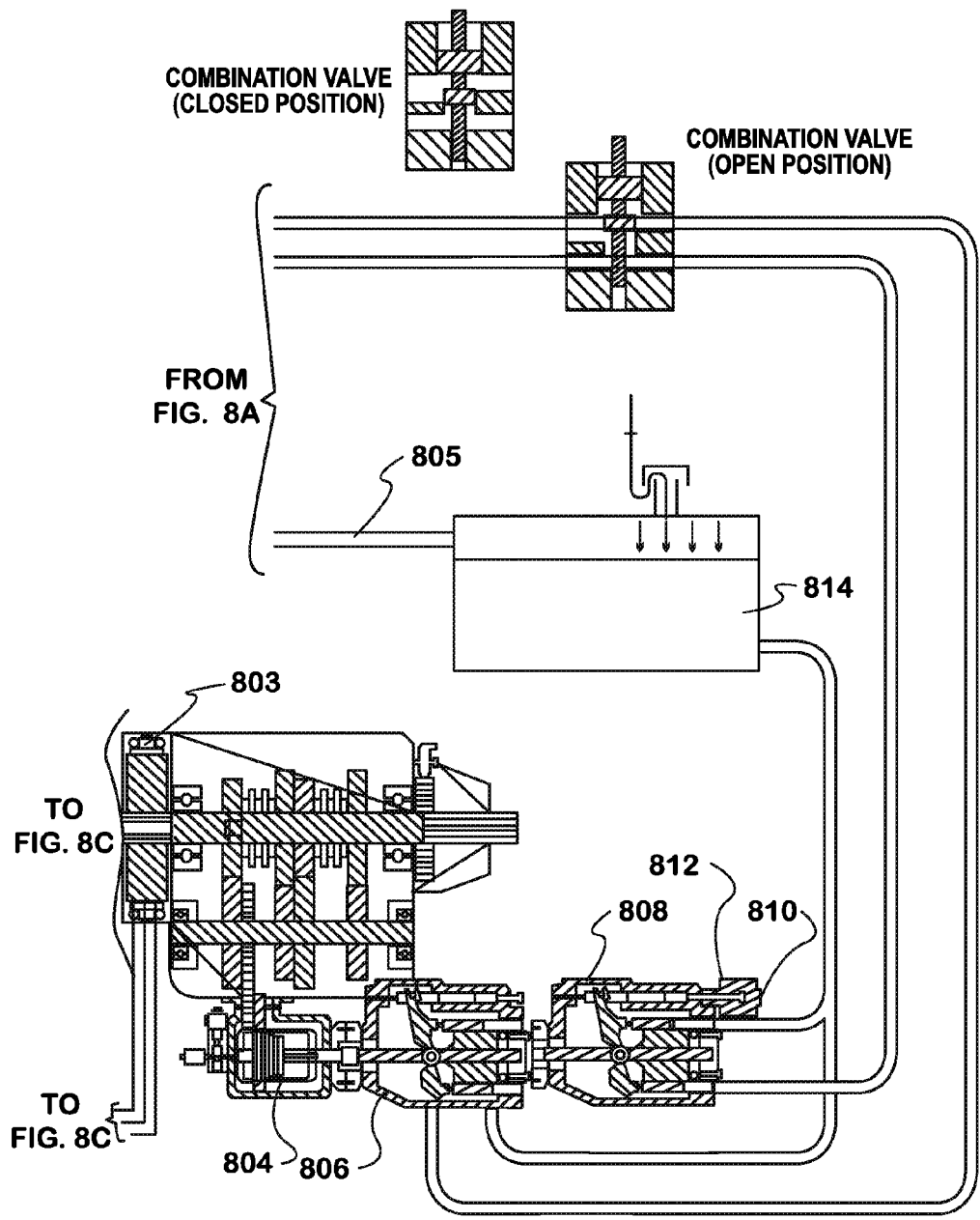
Figure 8C:
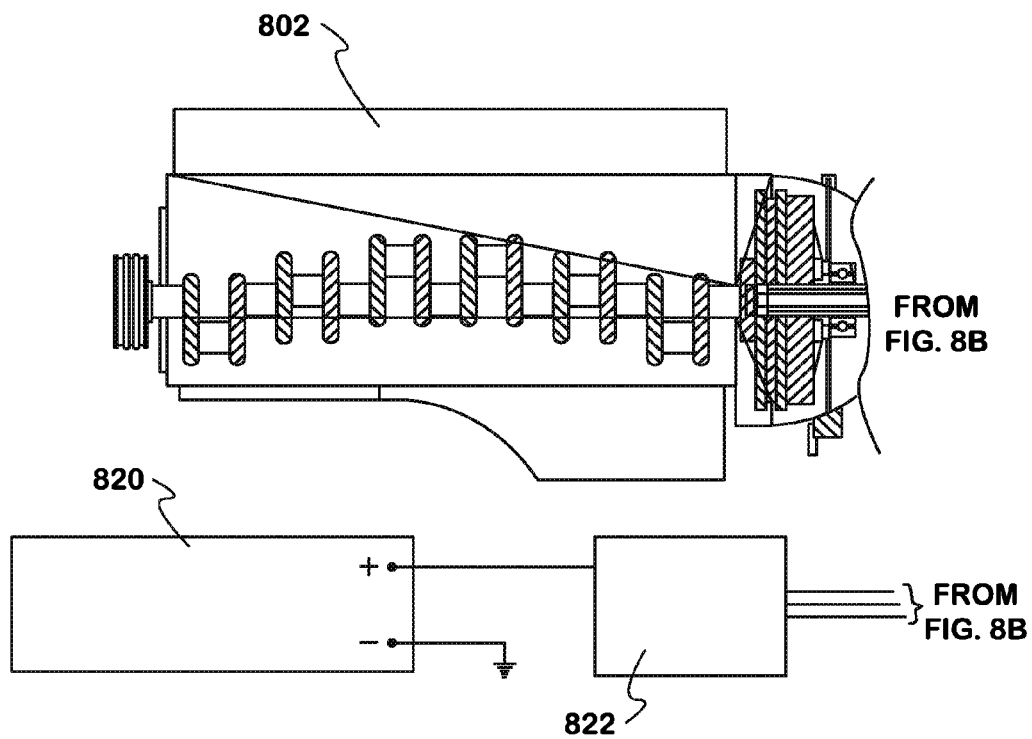
Figure 8D:
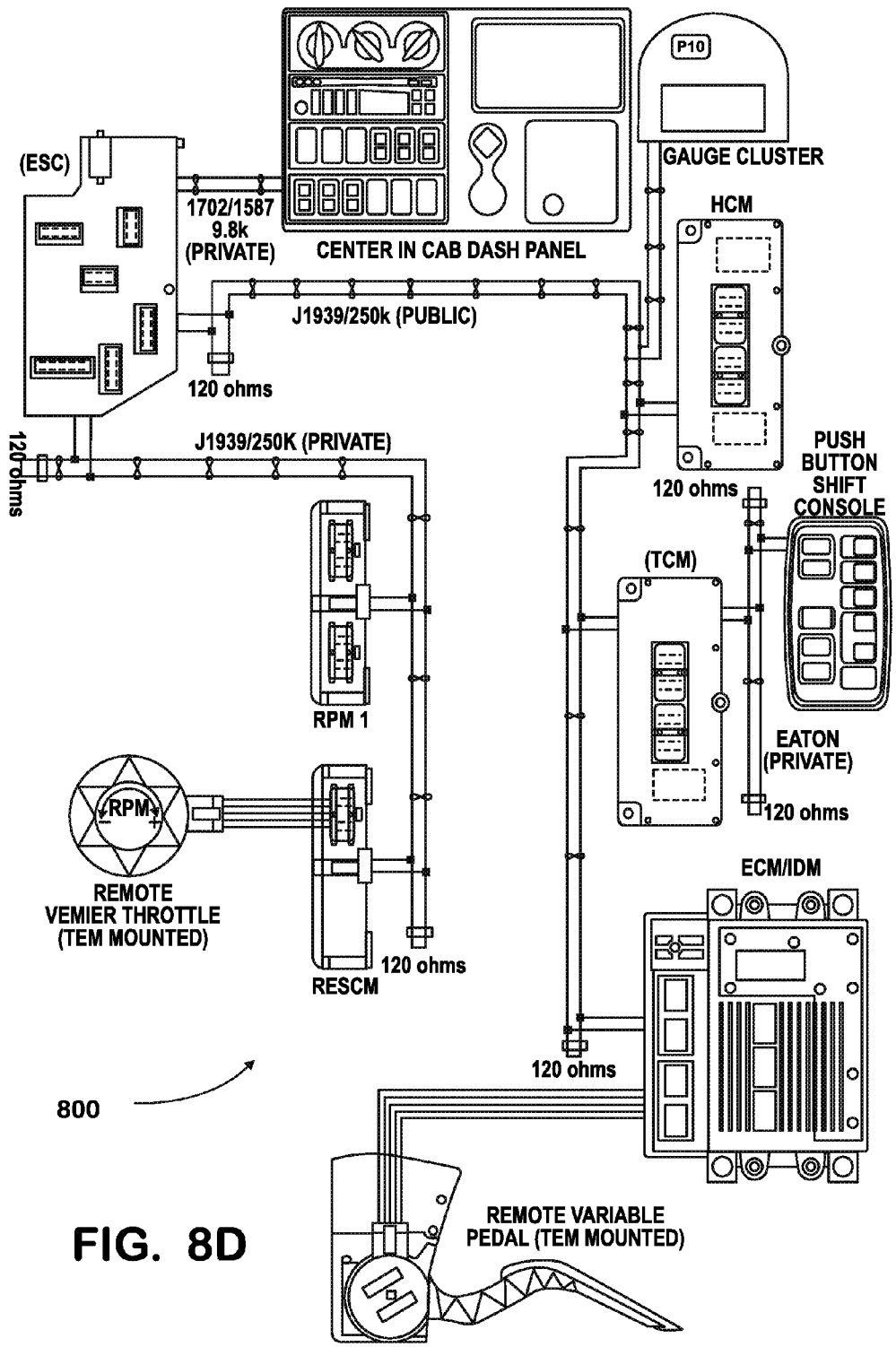

FIGS. 5-7 illustrate a specific control arrangement and network architecture on which the state machine 300 may be implemented. Additional information regarding control systems for hybrid powertrains may be found in U.S. patent application Ser. No. 12/239,885 filed on Sep. 29, 2008 and entitled "Hybrid Electric Vehicle Traction Motor Driven Power take off Control System" which is assigned to the assignee of the present application and which is fully incorporated herein by reference, as well as U.S. patent application Ser. No. 12/508,737 filed on Jul. 24, 2009, which is assigned to the assignee of the present application and which is fully incorporated herein by reference. The arrangement also provides control over a secondary pneumatic power take-off operation 87 to illustrate that conventional PTO may be mixed with EPTO on a vehicle. Electrical system controller 24 controls the secondary pneumatic PTO 87 using a multiple solenoid valve assembly 85. Available air pressure may dictate control responses and accordingly an air pressure transducer 99 is connected to provide air pressure readings directly as inputs to the electrical system controller 24. Alternatively, EPTO could be implemented using the pneumatic system if the traction motor PTO were an air pump.

The J1939 compliant cable 74 connecting ESC 24 to RPM 40 is a twisted pair of cables. RPM 40 is shown with 6 hardwire inputs (A-F) and one output. A twisted pair cable 64 conforming to the SAE J1708 standard connects ESC 24 to a inlay 64 for the cab dash panel on which various control switches are mounted. The public J1939 twisted pair cable 18 connects ESC 24 to the gauge controller 58, the hybrid controller 48 and the transmission controller 42. The transmission controller 42 is provided with a private connection to the cab mounted transmission control console 72. A connection between the hybrid controller 48 and the console 72 is omitted in this configuration though it may be provided in some contexts.

FIG. 6 illustrates in detail the input and output pin usage for RPM 40 for a specific application. Input pin A is the Hybrid Electric Vehicle demand circuit 1 input which can be a 12 volt DC or ground signal. When active the traction motor runs continuously. Input pin B is the Hybrid Electric Vehicle demand circuit 2 input which can be a 12 volt DC or ground signal. When active, the traction motor runs continuously. Input pin C is the Hybrid Electric Vehicle demand circuit 3 input which can be a 12 volt DC or ground signal. When the signal is active the traction motor runs continuously. Input pin D is the Hybrid Electric Vehicle demand circuit 4 input which can be a 12 volt DC or ground signal. When the signal is active the traction motor runs continuously. In other words the designer can provide four remote locations for switches from which an operator can initiate a PTO body power demand signal to operate the traction motor. Input pin E is a hybrid electric vehicle remote PTO disable input. The signal can be either 12 volts DC or ground. When active PTO is disabled. Input pin F is the hybrid electric vehicle EPTO engaged feedback signal. This signal is a ground signal originating with a PTO mounted pressure or ball detent feedback switch. The output pin carries the actual power demand signal. As noted this may be subject to various interlocks. In the example the interlock conditions are that measured vehicle speed be less than 3 miles per hour, the gear setting be neutral and the park brake set.

FIG. 7 illustrates the location of chassis output pins and chassis input pins on the electrical system controller 24.

The system described here provides a secondary mechanism for controlling the hybrid electric motor and generator through the use of various original equipment manufacturer (OEM) chassis inputs, circumventing the TEMs' input (demand) signal sourcing devices (e.g. the RPM 40). Initiating this mode of operation can be made as simple as desired by use of a single in-cab mounted switch, which may be located in the switch pack 56, or which may be made more complex and less obvious by using a sequence of control inputs to operate as a "code". For example, with the vehicle in EPTO mode, the service brake could be depressed and held and the high beams flashed on and off twice. Once the service brake is released subsequent activations of the high beams could generate a signal for toggling the traction motor's operation. In any event, when the traction motor is under the control of "chassis initiated" inputs. TEM input states are ignored or circumvented.

Turning now to FIG. 8, a hybrid-electric powertrain with a PTO driven hydraulic system 800 is shown. The hybrid-electric powertrain with a PTO driven hydraulic system 800 comprises an internal combustion engine 802, an electric motor and generator 803, a PTO 804, and a first hydraulic pump 806 and a second hydraulic pump 808. The PTO 804 is adapted to receive power from either the internal combustion engine 802 or the electric motor and generator 803. The PTO 804 drives the first hydraulic pump 804 and the second hydraulic pump 808.

As shown in FIG. 8, the first hydraulic pump 806 is a fixed displacement hydraulic pump, such as a vane pump, while the second hydraulic pump 808 is a variable displacement hydraulic pump, such as a piston pump.

The second hydraulic pump 808 has a control motor 810 and/or a control solenoid 812 to control the adjustment of the variable displacement setting of the second hydraulic pump 808. The control motor 810 may be a an electric motor, an electro-magnet stepper motor, or the like. The control solenoid 812 may be a an elecrto-magnetic solenoid device or the like.

It is contemplated that the internal combustion engine 802 may be utilized to drive the PTO 804 to power the first hydraulic pump 806, while the electric motor and generator 803 is typically utilized to power the second hydraulic pump 808. The use of the first hydraulic pump 806 or the second hydraulic pump 808 often depends on a load level placed on a hydraulic system 805. A large hydraulic load will utilize the first hydraulic pump 806 driven by the internal combustion engine 802, while a small hydraulic load will utilize the second hydraulic pump 808 driven by the electric motor and generator 803.

The internal combustion engine is adapted to supply torque to the hydraulic pumps 806, 808 at engine speeds from about 700 RPM to about 2000 RPM. However, the electric motor and generator 803 produces a high torque level at operating speeds of less than about 1500 RPM. Therefore, when the electric motor and generator 803 is being utilized to run the second hydraulic pump 808 via the PTO 804, displacement of the second hydraulic pump is adjusted to a larger displacement if the hydraulic load on the hydraulic system 805 requires the electric motor and generator 803 to operate at a speed above 1500 RPM. The control motor 810 and/or the control solenoid 812 increase the displacement of the second pump 808 such that electric motor and generator 803 may supply sufficient hydraulic fluid flow and pressure to the hydraulic system 805, while also operating at a speed of less than 1500 RPM.

Similarly, if the load within the hydraulic system 805 decreases, the displacement of the second hydraulic pump 808 may be adjusted to a smaller displacement, and the electric motor and generator 803 may be slowed to an speed below 1500 RPM.

In addition to adjusting the displacement of the second hydraulic pump 808 when the load of the hydraulic system 805 changes to a load that requires the electric motor and generator to operate a speed above 1500 RPM, it is also contemplated that the second hydraulic pump 808 may be adjusted by the control motor 810 and/or the control solenoid 812 to a displacement that allows the electric motor and generator to operate at a higher level of efficiency. For example, if the electric motor and generator produces torque most efficiently at a speed of 1300 RPM, the displacement of the second hydraulic pump 808 may be adjusted so that the load of the hydraulic system 805 is met by the second hydraulic pump 808, while the electric motor and generator is operating at the speed of 1300 RPM.

The hydraulic system 805 depicted in FIG. 8 further comprises a reservoir 814 that contains hydraulic fluid used in the hydraulic system 805. The reservoir is in fluid communication with hydraulic motors 816, hydraulic cylinders 817, and hydraulic valves 818 of the hydraulic system, providing the necessary fluid to operate the hydraulic motors 816, hydraulic cylinders 817, and hydraulic valves 818.

The electric motor and generator 803 is connected to a battery 820 and an electrical controller 822. The battery 820 stores electrical power for use by the electric motor and generator 803. The electrical controller 822 regulates electrical energy between the battery 820 and the electrical motor and generator 803.

Figure 9:
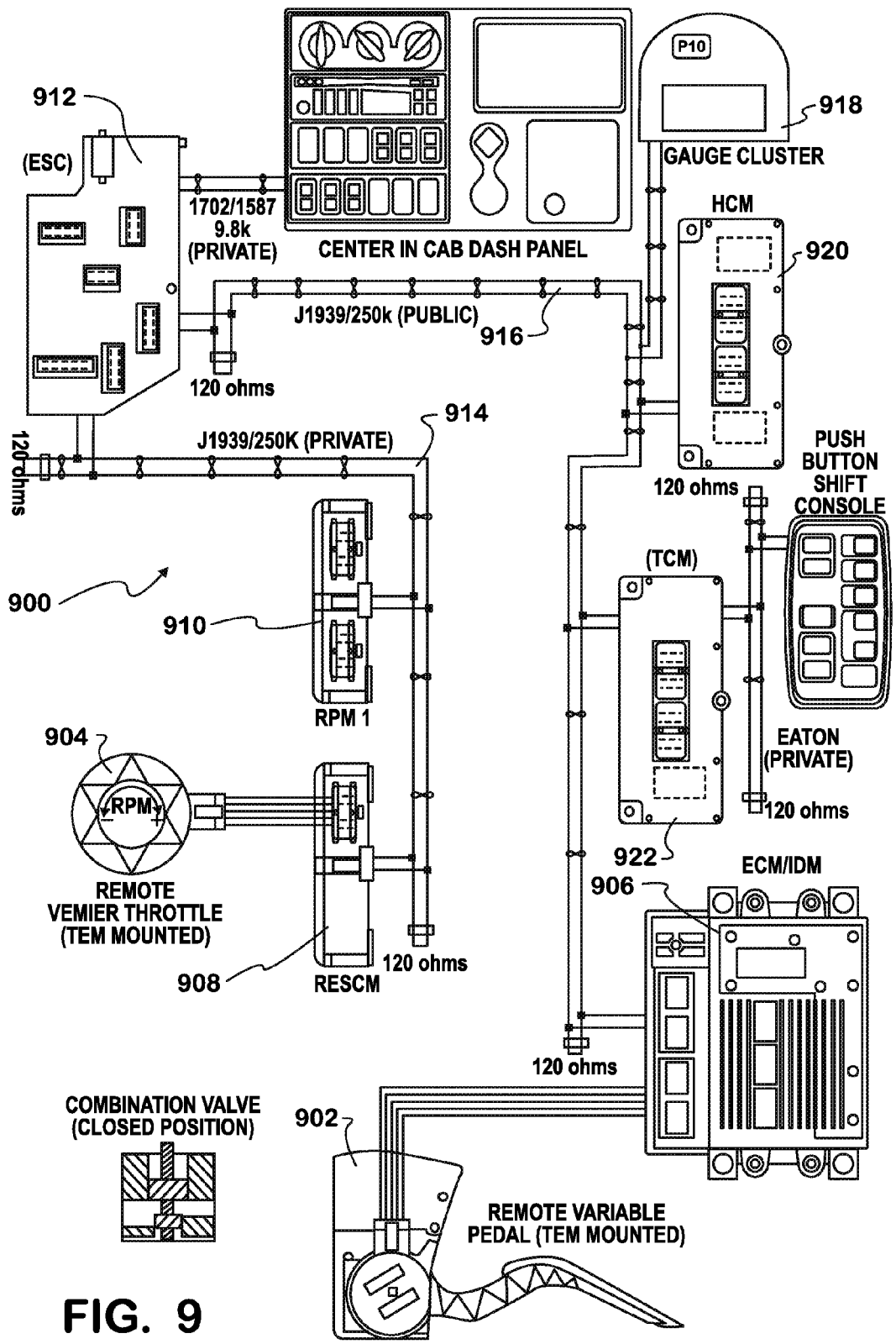
FIG. 9 is a system diagram for a control system of the vehicle of FIG. 8.

Turning now to FIG. 9, a specific control arrangement and network architecture 900 on which the hybrid-electric powertrain with a PTO driven hydraulic system 800 state may be implemented. A first remote throttle 902 and/or a second remote throttle 904 are provided on TEM components to give a user the ability to control the output of the electric motor and generator 803 or the internal combustion engine 802 in order to control the hydraulic system 805. The first remote throttle 902 is a variable pedal throttle, while the second remote throttle 904 is a hand operated vernier throttle.

As shown in FIG. 9, the first remote throttle is electrically connected to the Engine Control Module, or Electronic Control Module, ("ECM") 906. The second remote throttle 904 may be electrically connected to the ECM 906 via a remote engine speed control module ("RESCM") 908 or a remote power module 910. The RESCM 908 and the remote power module 910 are electronically connected to an Electronic System Controller ("ESC") 912 via a J1939 compliant cable 914.

The ESC 912 is electronically connected to the ECM 906 via a J1939 compliant cable 916. The J1939 compliant cable 916 additionally connects a gauge cluster 918, a hybrid control module 920, and a transmission control module 922 to the ECM 906. The ESC 912 monitors the internal combustion engine 802 and the electric motor and generator 803 as well as the demand of the hydraulic system 805 and input from the first remote throttle 904 and/or the second remote throttle 906, and generates control signals adapted to control the internal combustion engine 802 and the electric motor and generator 803. The demand of the hydraulic system 805 is greatly influenced by the input from the first remote throttle 904 and/or the second remote throttle 906.

The ESC 912 will generate speed commands for the internal combustion engine 802 and/or the electric motor and generator 803 such that the first hydraulic pump 804 and/or the second hydraulic pump 806 fulfill the demand of the hydraulic system 805. For instance, the ESC 912 may generate a signal that increases or decreases the speed of the electric motor and generator 803 in order to provide sufficient hydraulic fluid flow from the second hydraulic pump 806. Similarly, the ESC 912 may generate a signal that increases or decreases the speed of the internal combustion engine 802 in order to provide sufficient hydraulic fluid flow from the first hydraulic pump 804.

The ESC 912 additionally generates an output signal that is transmitted to the second hydraulic pump 806 in the event the displacement of the second hydraulic pump 806 is to be modified. If a hydraulic load is above a predetermined threshold, the displacement of the second hydraulic pump 806 maybe For instance, if the electric motor and generator 803 is being used to power the second hydraulic pump, and the speed of the electric motor and generator 803 is approaching 2000 RPM, the ESC 912 generates an output signal that causes the control motor 810 or the control solenoid 812 to increase the displacement of the second hydraulic pump 806, such that the output of the second hydraulic pump 806 is increased, and the speed of the electric motor and generator 803 is maintained in a proper operating range.

It is additionally contemplated that both the first hydraulic pump 804 and the second hydraulic pump 806 may be used simultaneously. In such a configuration the ESC 912 generates an output signal to the control motor 810 or the control solenoid 812 in order to vary the displacement of the second hydraulic pump 806. In such a configuration, a smaller first hydraulic pump 804 may be utilized, as the second hydraulic pump 806 will provide additionally pumping capacity to satisfy the demands of the hydraulic system 805.

The hydraulic system 805 of the present embodiment may be utilized to power variable speed applications, such as digger derricks, pressure diggers, document shredders, and other variable speed devices.

Additionally, the use of the a variable displacement second hydraulic pump 806 enhances energy utilization by the hybrid-electric powertrain with a PTO driven hydraulic system 800, as the engine 802 and/or the electric motor and generator 803 may be operated at more efficient settings. Therefore, fuel usage, or electric power required, will be lowered.

Figure 10A:
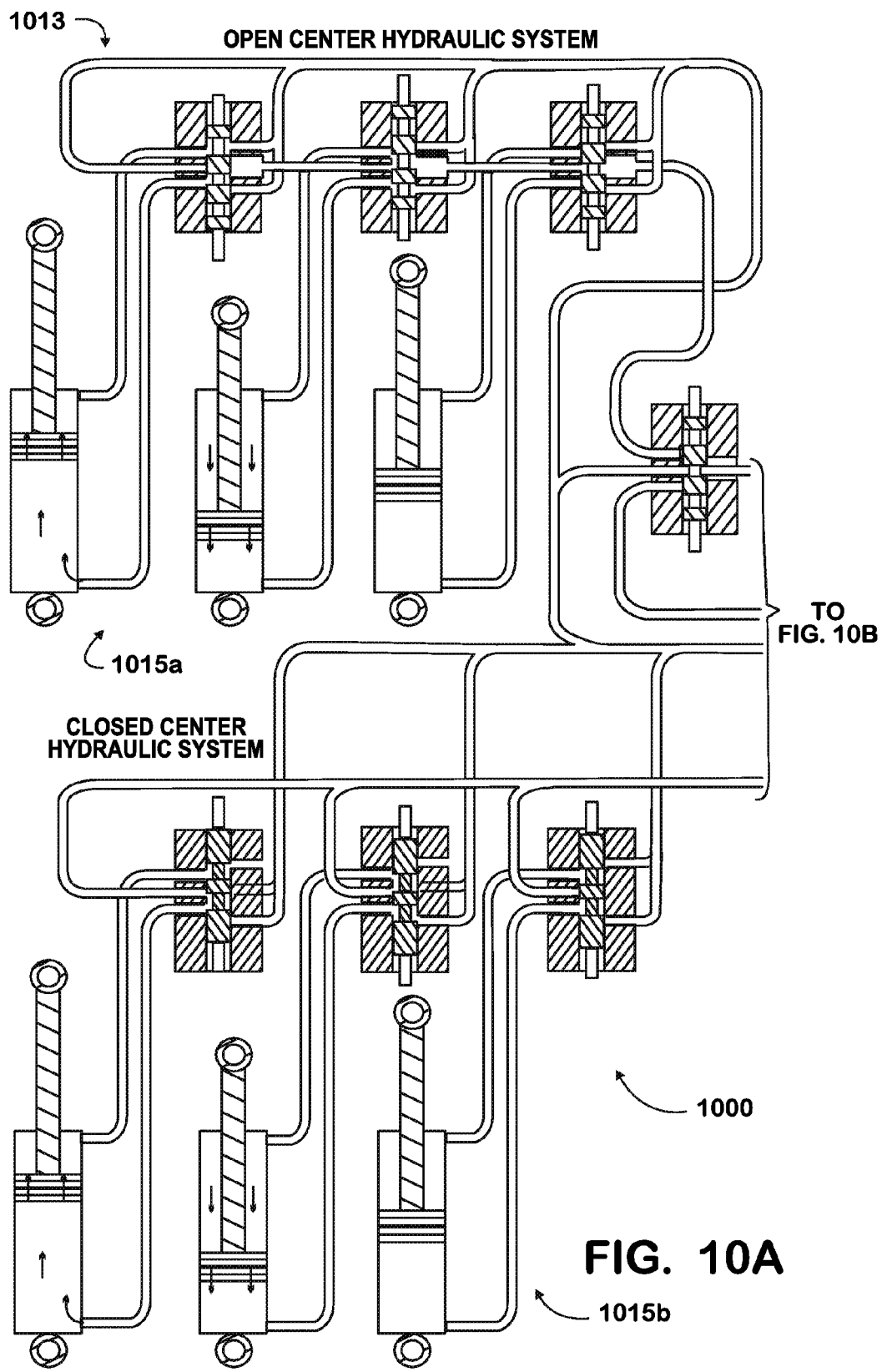
FIG. 10 is a schematic view of a vehicle having a hybrid-electric powertrain with a PTO driven hydraulic system having an accumulator and an accumulator isolation valve.
Figure 10B:
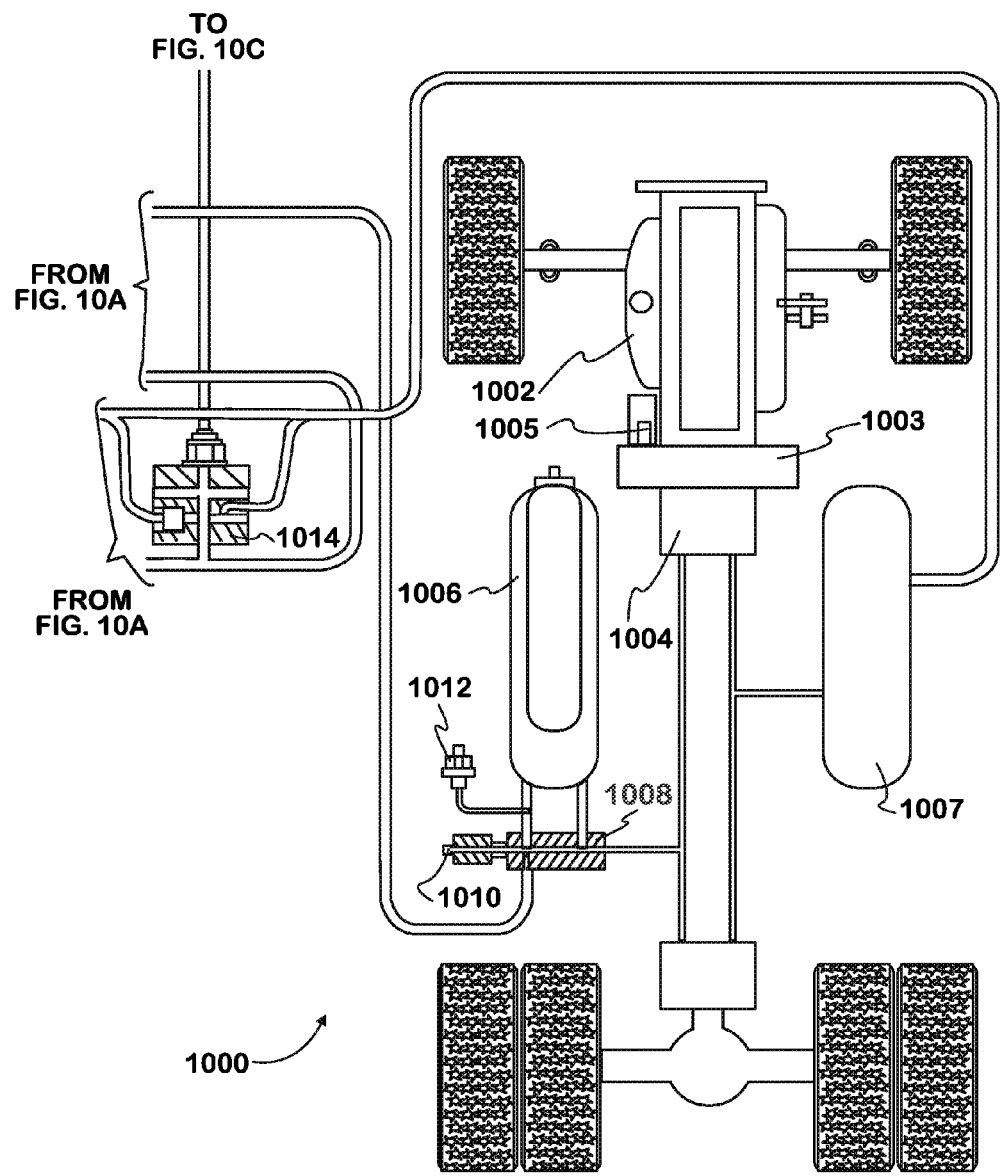
Figure 10C:
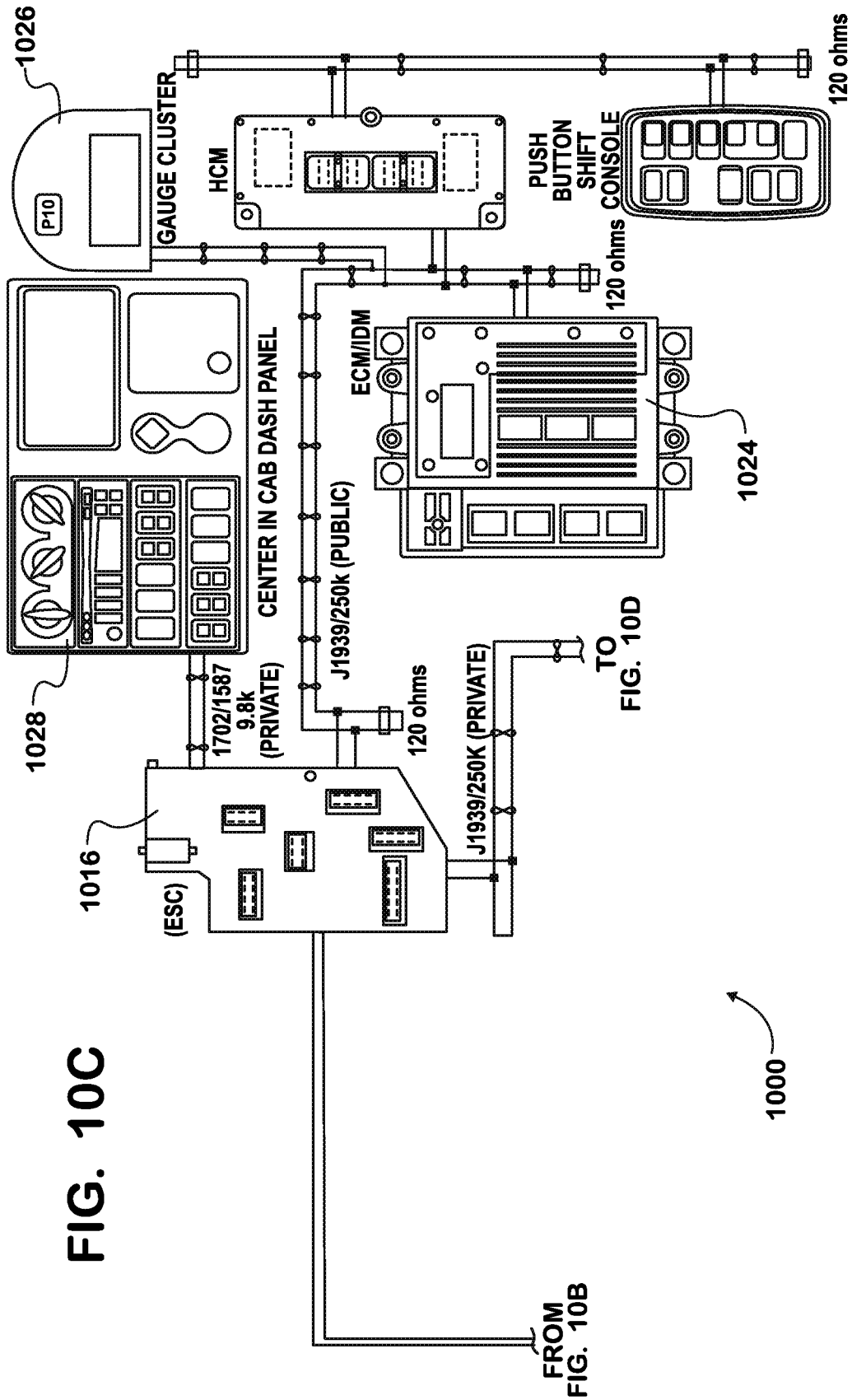

Turning next to FIG. 10 a hydraulic hybrid powertrain 1000. The hydraulic hybrid powertrain 1000 comprises an internal combustion engine 1002 a hydraulic pump 1004 connected to and driven by a PTO 1003. The PTO may be powered by the internal combustion engine 1002, or may be a PTO has described above that may be powered by an electric motor and generator 1005 and/or the internal combustion engine 1002.

The hydraulic hybrid powertrain 1000 additionally comprises a hydraulic accumulator 1006 disposed in fluid communication with the hydraulic pump 1004.

The hydraulic accumulator 1006 is adapted to store pressurized hydraulic fluid from the hydraulic pump 1004. A hydraulic reservoir 1007 additionally is provided in fluid communication with the hydraulic pump 1004. The hydraulic reservoir 1007 stores low pressure hydraulic fluid that may be pressurized by the hydraulic pump 1004.

An accumulator isolation valve 1008 is disposed at an outlet of the hydraulic accumulator 1006. The accumulator isolation valve 1008 controls the flow of hydraulic fluid from the hydraulic accumulator 1006. An accumulator solenoid 1010 positions the accumulator isolation valve 1008 between at least a first position that allows hydraulic fluid to flow from the hydraulic accumulator 1006 and a second position that prevents hydraulic fluid from flowing from the hydraulic accumulator 1006. It is contemplated that the accumulator solenoid 1010 may also position the accumulator isolation valve 1008 at a variety of intermediate positions between the first position and the second position to control the flow of hydraulic fluid from the hydraulic accumulator 1006.

An accumulator transducer 1012 is disposed in fluid communication with the hydraulic accumulator 1006. The accumulator transducer 1012 provides an output signal to monitor the pressure within the hydraulic accumulator 1012. The accumulator transducer 1012 may be utilized to control operation of the hydraulic pump 1004 such that pressure within the hydraulic accumulator 1006 may be maintained at operating levels, yet the hydraulic pump 1004 may only be operated intermittently.

The hydraulic hybrid powertrain 1000 additionally comprises vehicle hydraulic system 1013. The vehicle hydraulic system 1013 may comprise an open center hydraulic system 1015a, a closed center hydraulic system 1015b, or both the open center hydraulic system 1015a, and the closed center hydraulic system 1015b.

The vehicle hydraulic system 1013 comprises a vehicle hydraulic component transducer 1014. The vehicle hydraulic component transducer 1014 generates an output signal in response to a hydraulic load within the vehicle hydraulic system. The vehicle hydraulic component transducer 1014 is in electrical communication with an ESC 1016. The ESC 1016 is in electrical communication with a RPM 1018, an ECM 1024, an operator display 1026, and a gauge cluster 1028.

The ESC 1016 monitors the output of the hydraulic component transducer 1014 and causes the RPM 1018 to generate an output signal 1022 that is transmitted to the accumulator solenoid 1010 to position the accumulator isolation valve 1008. The RPM 1018 additionally is adapted to receive input signals 1020 from vehicle hydraulic system 1013 indicating that the vehicle hydraulic system 1013 has been activated. The RPM 1018 may thus generate the output signal 1022 that is transmitted to the accumulator solenoid 101 to position the accumulator isolation valve 1008. It is contemplated that the input signals 1020 from the vehicle hydraulic system 1013 may be utilized generate the output signal 1022 to control an initial opening of the accumulator isolation valve 1008. It is contemplated that the input signals from the vehicle hydraulic component transducer 1014 may be utilized to generate the output signal 1022 to control the closing of the accumulator isolation valve 1008 when no hydraulic load is present within the vehicle hydraulic system 1013.

The ESC 1016 may also be utilized to reduce the speed of the internal combustion engine 1002, or even shut off the engine 1002, when no hydraulic load is present within the vehicle hydraulic system 1013, by communicating with the ECM 1024. Similarly, the ESC 1016 may be utilized to increase the speed of the internal combustion engine 1002 via the ECM 1024 if the load present within the vehicle hydraulic system 1013 is not being met by the hydraulic pressure within the hydraulic accumulator 1006 and the hydraulic pump 1004 is required to raise the pressure with in the hydraulic accumulator 1006.

The accumulator transducer 1012 may be used to generate a message on the operator display 1026, or cause an indication on the gauge cluster 1028, such that an operator may know the state of the hydraulic accumulator 1006.

The accumulator isolation valve 1008 reduces internal parasitic leakage within the vehicle hydraulic system 1013 by preventing hydraulic fluid from the hydraulic accumulator 1006 to flow past the closed accumulator isolation valve 1008.

What is claimed is:

1. A vehicle having a hydraulic hybrid powertrain comprising:
   a power take off unit;
   a hydraulic pump being mechanically connected to the power take off unit and being driven by the power take off unit;
   a hydraulic accumulator disposed in fluid communication with the hydraulic pump and receiving and storing pressurized hydraulic fluid from the hydraulic pump;
   an accumulator isolation valve having a first position and second position, the accumulator isolation valve being disposed in fluid communication with the hydraulic accumulator;
   an accumulator solenoid connected to the accumulator isolation valve and being adapted to position the accumulator isolation valve to the first position and the second position; and
   a vehicle hydraulic component being disposed in fluid communication with the accumulator isolation valve and the hydraulic accumulator.

2. The vehicle having a hydraulic hybrid powertrain of claim 1 further comprising
   an accumulator transducer being disposed in fluid communication with the hydraulic accumulator, the accumulator transducer and generating an output indicative of an amount of pressure within the hydraulic accumulator.

3. The vehicle having a hydraulic hybrid powertrain of claim 1 further comprising
   a vehicle hydraulic component transducer being disposed in fluid communication the vehicle hydraulic component, the vehicle hydraulic component transducer generating an output indicative of demand on the hydraulic accumulator from the vehicle hydraulic component.

4. The vehicle having a hydraulic hybrid powertrain of claim 1 wherein the vehicle hydraulic component is an open center hydraulic component.

5. The vehicle having a hydraulic hybrid powertrain of claim 1 wherein the vehicle hydraulic component is a closed center hydraulic component.

6. The vehicle having a hydraulic hybrid powertrain of claim 1 wherein the accumulator isolation valve in the first position interrupts fluid communication between the hydraulic accumulator and the vehicle hydraulic component.

7. The vehicle having a hydraulic hybrid powertrain of claim 1 wherein the accumulator isolation valve in the second position allows fluid communication between the hydraulic accumulator and the vehicle hydraulic component.

8. The vehicle having a hydraulic hybrid powertrain of claim 1 wherein the vehicle hydraulic component is a utility aerial tower.

9. The vehicle having a hydraulic hybrid powertrain of claim 1 further comprising
   a hybrid-electric powertrain having an engine and an electric motor and generator, wherein the engine and the electric motor are mechanically connected to the power take off unit.

* * * * *